United States Patent
Bouchard

(10) Patent No.: US 12,458,554 B2
(45) Date of Patent: Nov. 4, 2025

(54) SYSTEM FOR ATTACHING EQUIPMENT TO A SUPPORT SYSTEM

(71) Applicant: TECHNOLOGIES CGC INC., Quebec (CA)

(72) Inventor: Carl Bouchard, Quebec (CA)

(73) Assignee: TECHNOLOGIES CGC INC., Quebec (CA)

( * ) Notice: Subject to any disclaimer, the term of this patent is extended or adjusted under 35 U.S.C. 154(b) by 303 days.

(21) Appl. No.: 18/245,169

(22) PCT Filed: Sep. 14, 2021

(86) PCT No.: PCT/CA2021/051278
§ 371 (c)(1),
(2) Date: Mar. 14, 2023

(87) PCT Pub. No.: WO2022/051871
PCT Pub. Date: Mar. 17, 2022

(65) Prior Publication Data
US 2023/0346620 A1    Nov. 2, 2023

Related U.S. Application Data

(60) Provisional application No. 63/078,013, filed on Sep. 14, 2020.

(51) Int. Cl.
*A61G 13/10* (2006.01)
*F16M 11/04* (2006.01)
(Continued)

(52) U.S. Cl.
CPC ......... *A61G 13/101* (2013.01); *F16M 11/041* (2013.01); *F16M 13/022* (2013.01); *G06F 1/1607* (2013.01)

(58) Field of Classification Search
CPC .... G06F 1/1632; G06F 1/1654; G06F 1/1607; G06F 1/1626; G06F 2200/163;
(Continued)

(56) References Cited

U.S. PATENT DOCUMENTS

| 4,511,158 A | 4/1985 | Varga et al. |
| 5,152,486 A | 10/1992 | Kabanek et al. |

(Continued)

FOREIGN PATENT DOCUMENTS

| DE | 102017110001 A1 | 11/2018 |
| KR | 20120061425 A | 6/2012 |

(Continued)

OTHER PUBLICATIONS

International Search Report and Written Opinion issued in corresponding International application No. PCT/CA2021/051278 on Dec. 10, 2021.

*Primary Examiner* — Justin C Mikowski
*Assistant Examiner* — Madison Emanski
(74) *Attorney, Agent, or Firm* — BCF LLP

(57) ABSTRACT

A system for attaching an equipment to a support surface, the system comprising: an equipment support unit having an equipment body support portion to support a body of the equipment, an adaptor unit for attaching the equipment support unit to the support surface, the adaptor unit comprising: an adaptor equipment support portion having: an 5 adaptor equipment support attachment mechanism configured to releasably attach the equipment support unit to the adaptor unit, and an adaptor support surface portion configured to attach the adaptor unit to the support surface; and a release mechanism for releasing the attachment of the tablet support unit to the adaptor unit.

20 Claims, 14 Drawing Sheets

(51) Int. Cl.
*F16M 13/02* (2006.01)
*G06F 1/16* (2006.01)

(58) Field of Classification Search
CPC ........... G06F 2200/1633; F16M 13/02; F16M 13/00; F16M 11/041; F16M 13/022; F16M 11/2085; F16M 11/10; A47C 21/003; A61G 13/101; A61G 2203/20; A61G 7/0503
USPC .............................. 248/176.3, 205.1; 5/658
See application file for complete search history.

(56) References Cited

U.S. PATENT DOCUMENTS

| | | |
|---|---|---|
| 5,362,021 A | 11/1994 | Phillips |
| 9,746,125 B2 | 8/2017 | Bowman |
| 11,007,951 B1 | 5/2021 | Zarecky |
| 2002/0011543 A1 | 1/2002 | Chinn et al. |
| 2003/0046764 A1 | 3/2003 | Smeed |
| 2008/0128571 A1* | 6/2008 | Dostaler ............... B62B 3/1428 248/231.51 |
| 2008/0217910 A1 | 9/2008 | Walke |
| 2012/0262039 A1 | 10/2012 | Daugbjerg et al. |
| 2014/0265752 A1 | 9/2014 | Caine et al. |
| 2014/0374564 A1 | 12/2014 | Schroeder et al. |
| 2014/0374565 A1 | 12/2014 | Tan |
| 2015/0041419 A1 | 2/2015 | Hasegawa |
| 2015/0090849 A1 | 4/2015 | Breitweiser et al. |
| 2015/0273138 A1 | 10/2015 | Wolff et al. |
| 2016/0031382 A1 | 2/2016 | Chinn et al. |
| 2016/0153720 A1* | 6/2016 | Huang ................. F28D 15/046 165/104.21 |
| 2016/0324701 A1 | 11/2016 | Cambridge et al. |
| 2017/0102735 A1* | 4/2017 | Blowers .............. E05B 73/0082 |
| 2017/0209318 A1 | 7/2017 | Schroeder et al. |

FOREIGN PATENT DOCUMENTS

| | | | |
|---|---|---|---|
| KR | 101410637 B1 | 6/2014 | |
| WO | WO-2015106232 A1 * | 7/2015 | ............... A61G 1/00 |
| WO | 2017089251 A1 | 6/2017 | |

* cited by examiner

SYSTEM FOR ATTACHING EQUIPMENT TO A SUPPORT SYSTEM

TECHNICAL FIELD

The present technology relates to a system for attaching equipment to a support surface, such as but not limited to a system for attaching a tablet to a stretcher.

BACKGROUND

Patient transportation systems include, for example, stretchers, wheelchairs and portable beds. Oftentimes, along with transporting the patient, there is often a need to transport equipment associated with the patient. Such equipment may comprise a tablet for which to input data about the patient, or for communications with the client or between the client and a third party, or medical equipment.

A number of factors must be taken into account when such equipment is being transported. Such equipment must be secured during transportation to prevent injuries as well as damage to the equipment. Equipment can be heavy and cumbersome and often lack handles for ease of transportation. The manner of securing the equipment must not restrict access to either the equipment or the patient, and should allow the equipment to be installed and removed easily.

In the case of tablets, there is no current satisfactory solution of mounting a tablet to patient transportation systems, and typically the tablet is placed on the patients themselves.

Therefore, this is far from ideal. The equipment is not secured in a manner which allows for secure restraint, ease of access, as well as quick and easy release.

Therefore, there is a need for a system which overcomes or reduces at least some of the above-described problems.

SUMMARY

Embodiments of the present technology have been developed based on inventors' appreciation of at least one shortcoming associated with the prior art approaches to transportation of equipment.

From one aspect, there is provided a system for attaching an equipment to a support surface, as described herein and defined in the appended claims.

From another aspect, there is provided a tablet mount, as described herein and defined in the appended claims.

From another aspect, there is provided an adaptor unit for attaching a tablet to a support surface, as described herein and defined in the appended claims.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which.

Figure 1:
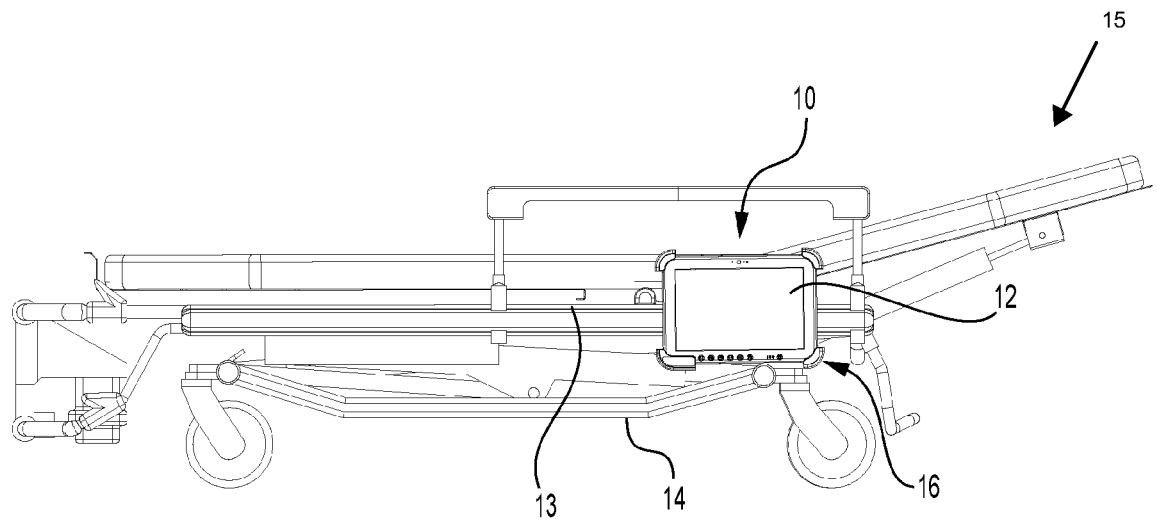
FIG. 1 is a left side view of a stretcher having mounted thereon a tablet using a system for mounting equipment to a support surface, according to certain embodiments of the present technology.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiments of a bracket for supporting portable equipment. It should be understood that other non-limiting embodiments, modifications and equivalents will be evident to one of ordinary skill in the art in view of the non-limiting embodiments disclosed herein and that these variants should be within scope of the appended claims. Furthermore, it will be recognized by one of ordinary skill in the art that certain structural and operational details of the non-limiting embodiments discussed hereafter may be modified or omitted (i.e. non-essential) altogether. In other instances, well known methods, procedures, and components have not been described in detail.

Referring initially to FIGS. 1-7, according to non-limiting embodiments of the present technology, there is provided a system 10 for attaching a tablet 12 to a support surface 14. In the illustrated embodiments, the support surface 14 comprises a rail 13 of a stretcher 15. However, without limitation, the support surface 14 may comprise any other type of support surface such as, one or more of: (1) a manual transportation device such as a wheelchair, a mobile bed, a cot, or a trolley, (2) a portion of a vehicle such as a wall or floor of an ambulance, a police car, a fire-engine, a helicopter, an airplane, a train, a military vehicle, or (3) an immobile support surface such as a wall or floor of a building. In other embodiments, instead of a tablet 10, the system 10 may be used to releasably attach any equipment to a support surface, such as but not limited to one or more of: a personal computer, a mobile telephone, a camera, a medical equipment. In certain embodiments, the tablet 12 comprises a Panasonic toughbook FZ-G1 with external dimensions of 26.92×18.79×2.03 cm). Other types and sizes of tablets are also within the scope of the present disclosure.

Figure 2:
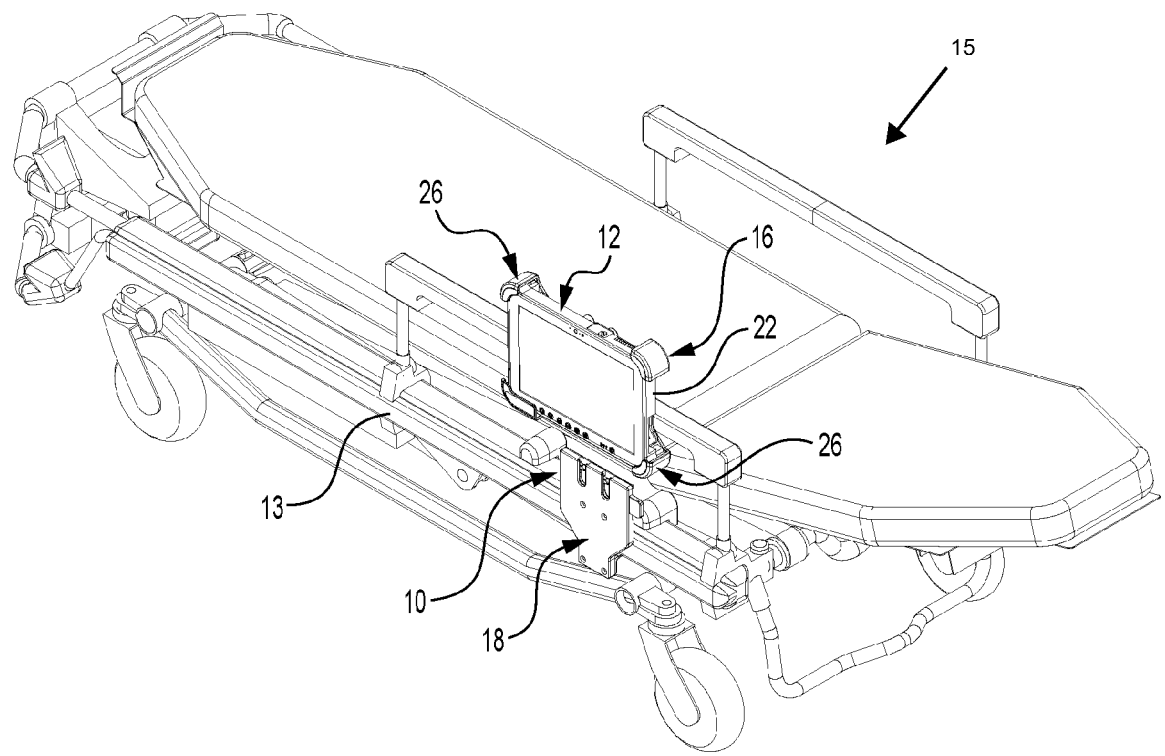
FIG. 2 is a perspective view from the top of the system of FIG. 1 with the tablet separated from the system for ease of reference and showing the system from a front side, according to certain embodiments of the present technology.
Figure 3:
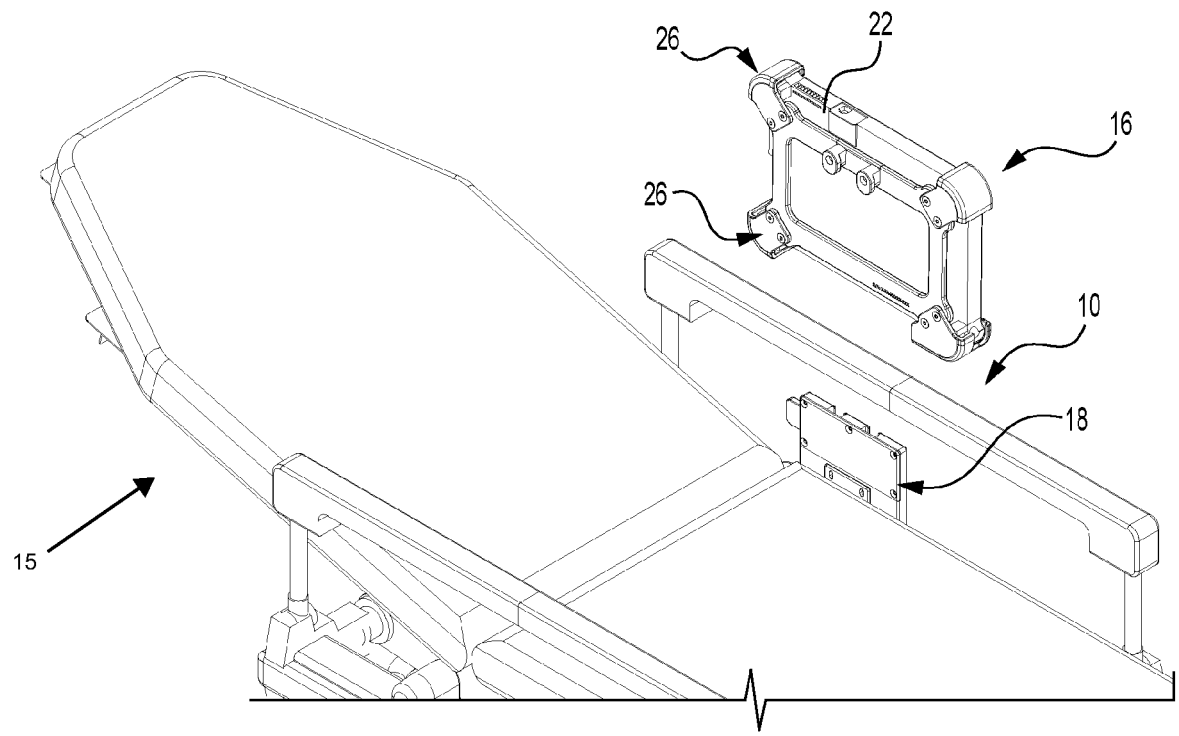
FIG. 3 is a perspective from the right side of the stretcher of FIG. 2 showing the system from a back side, according to certain embodiments of the present technology.
Figure 4:
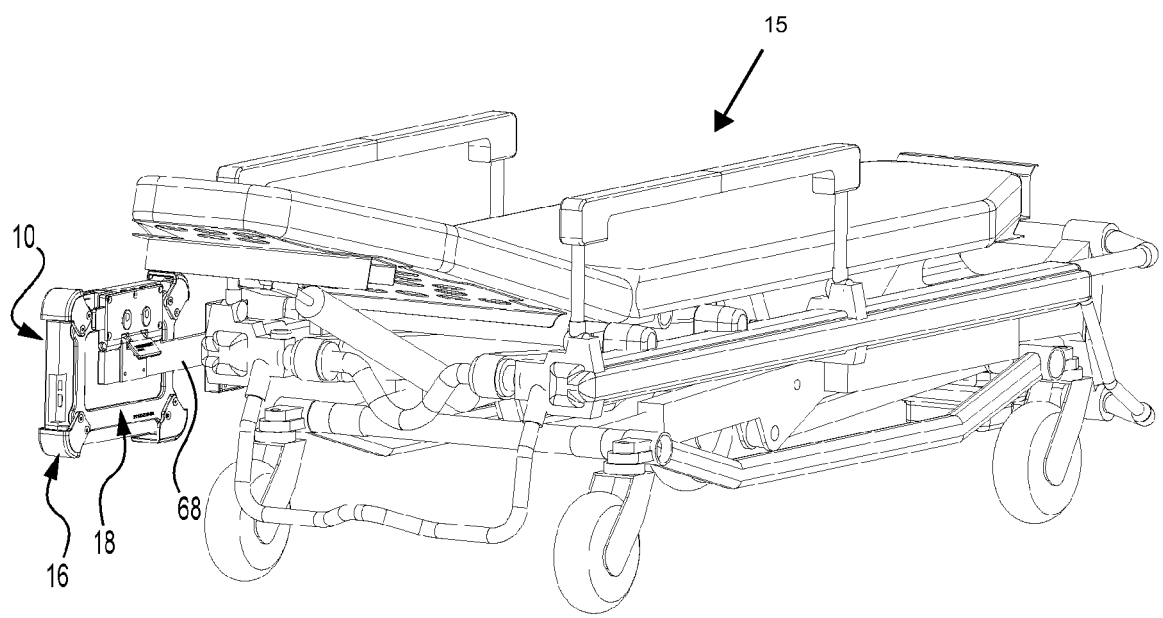
FIG. 4 is a perspective view from a top end of a stretcher having mounted thereon a tablet using a different embodiment of the system of FIGS. 1-3, according to certain embodiments of the present technology.
Figure 5:
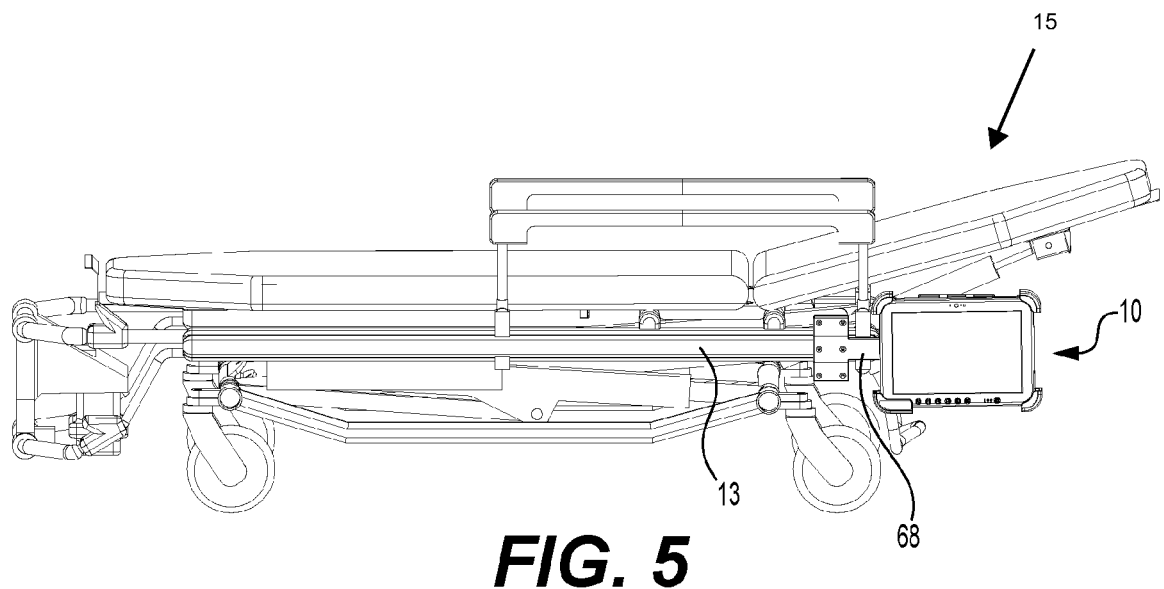
FIG. 5 is a left side view of the stretcher and system of FIG. 4, according to certain embodiments of the present technology.
Figure 6:
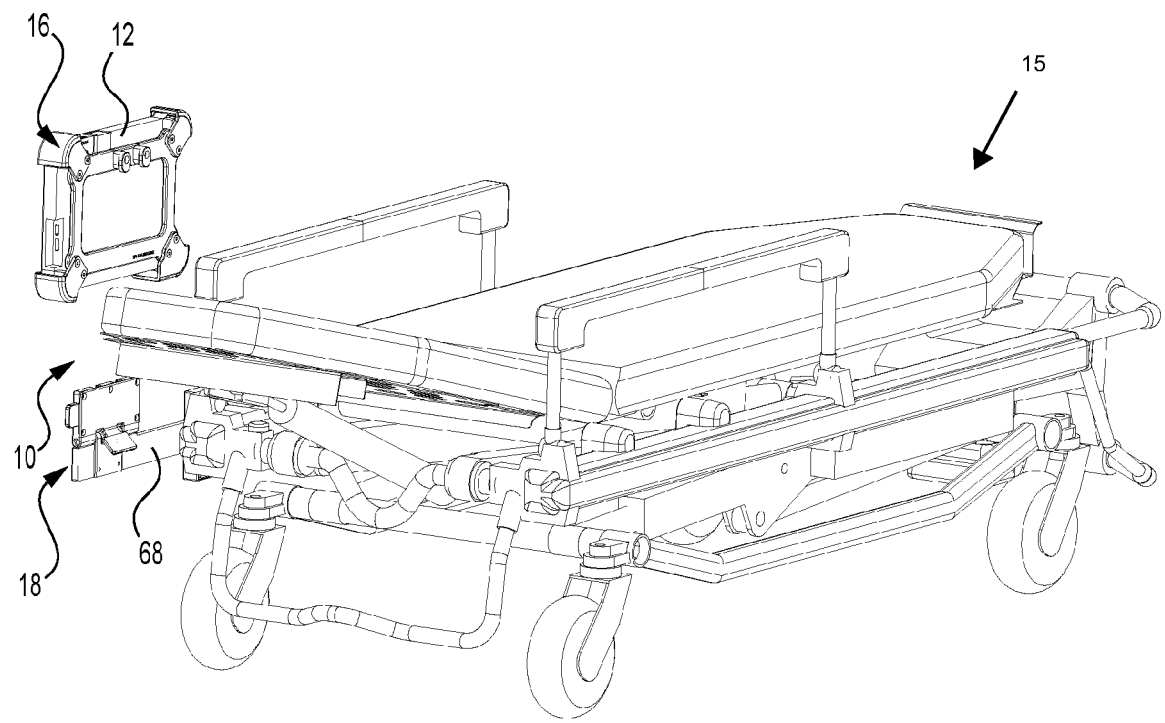
FIG. 6 is a perspective view from a top end of the stretcher of FIG. 4, with the tablet separated from the system for ease of reference, according to certain embodiments of the present technology.
Figure 7:
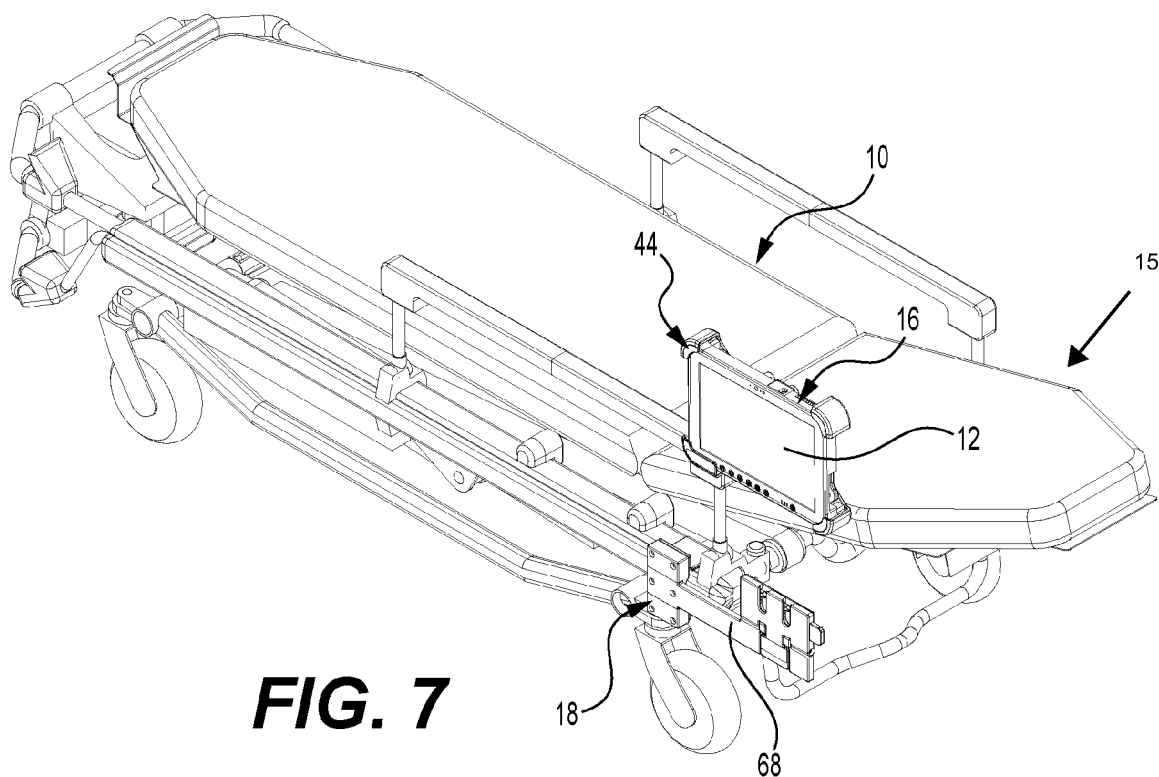
FIG. 7 is a perspective view from the left side of the stretcher, tablet and system, of FIG. 6, according to certain embodiments of the present technology.
Figure 8:
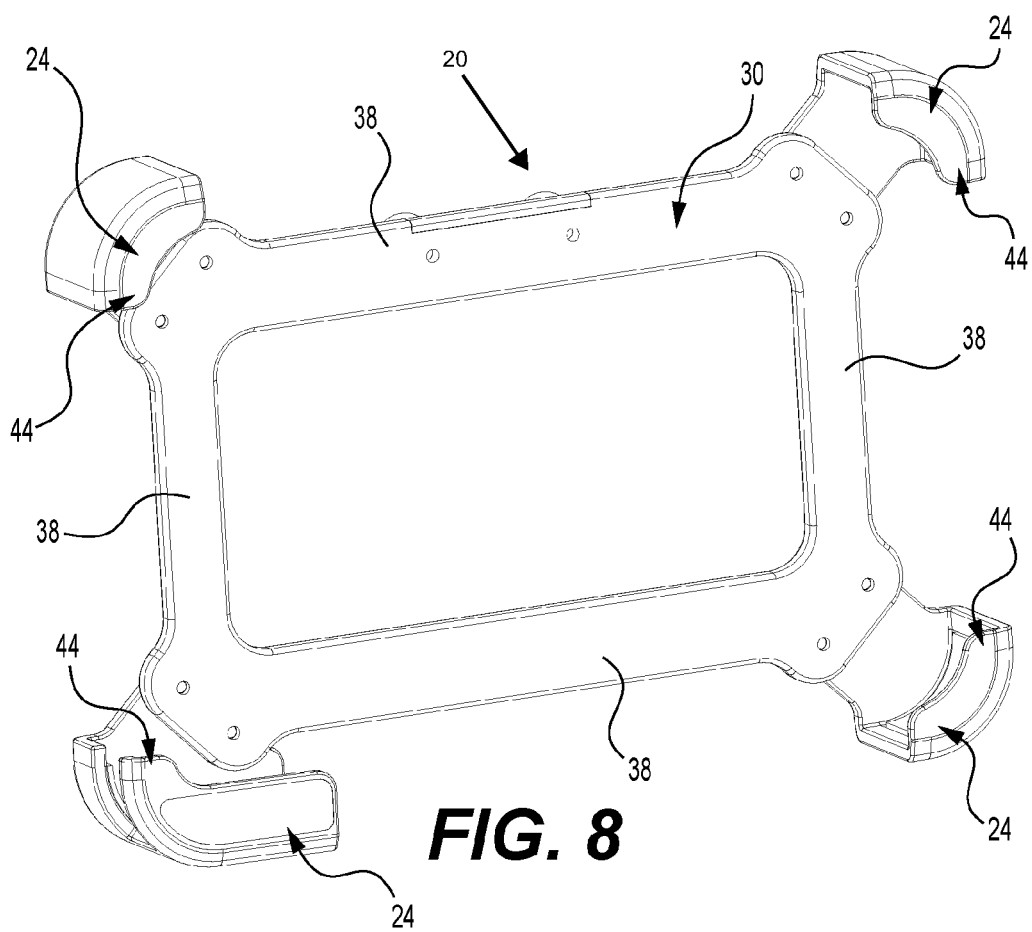
FIG. 8 is a back frame and tablet corner support portions of a tablet support unit of the system of FIG. 1 and/or FIG. 4, according to certain embodiments of the present technology.

The system 10 comprises a tablet support unit (also referred to as a "equipment support unit") for supporting the tablet 12 and an adaptor unit 18 configured to attach to both the tablet support unit 16 and a support surface 14, thereby connecting the tablet 12 to the support surface 14. FIGS. 1-3 illustrate a non-extended embodiment of the adaptor unit 18, and FIGS. 4-7 illustrates an extended embodiment of the adaptor unit 18.

Referring first to the tablet support unit 16, with reference to FIGS. 8-11, the tablet support unit 16 comprises a tablet body support portion 20 (also referred to as an equipment body support portion) to support a body 22 of the tablet 12, and four tablet corner support portions 24 (also referred to as equipment edge support portions) for supporting each one of four corners 26 of the tablet 12. More or less than the four tablet corner support portions 24 may be provided. In certain embodiments, the tablet corner support portions 24 may be configured for supporting an edge of an equipment, and not necessarily a corner.

Figure 9:
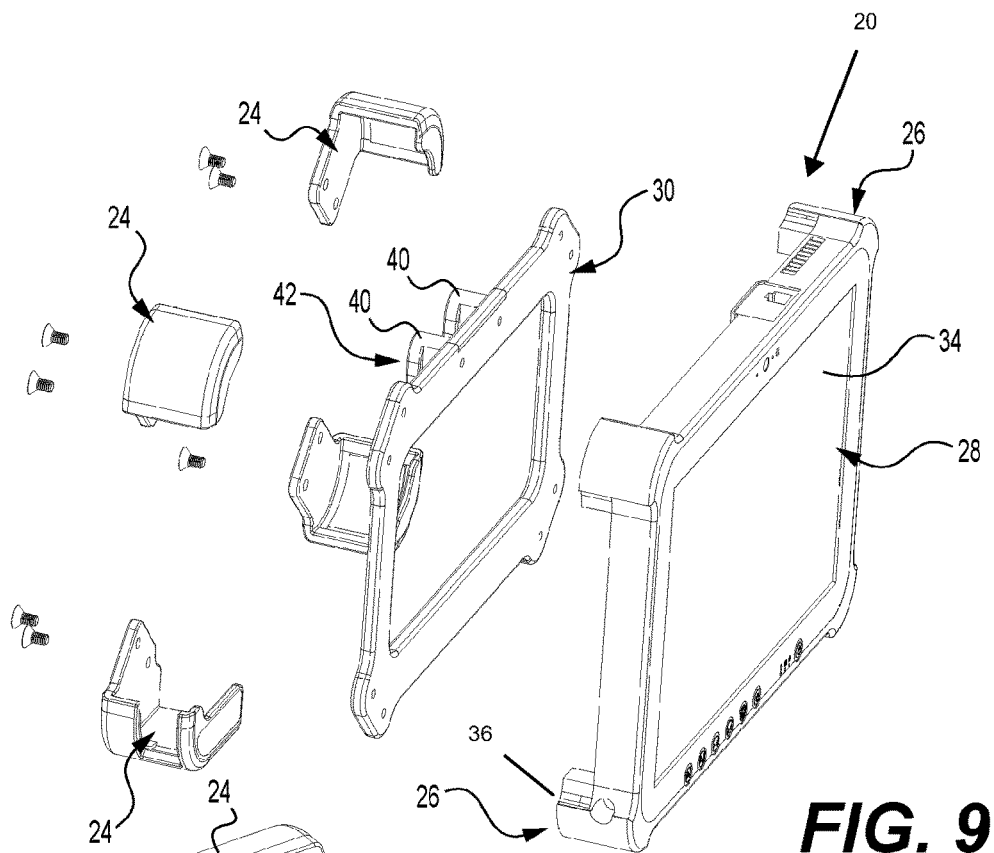
FIG. 9 is an exploded view of a tablet support unit including the back frame and tablet corner support portions of FIG. 8, as well as a back frame, according to certain embodiments of the present technology.
Figure 10:
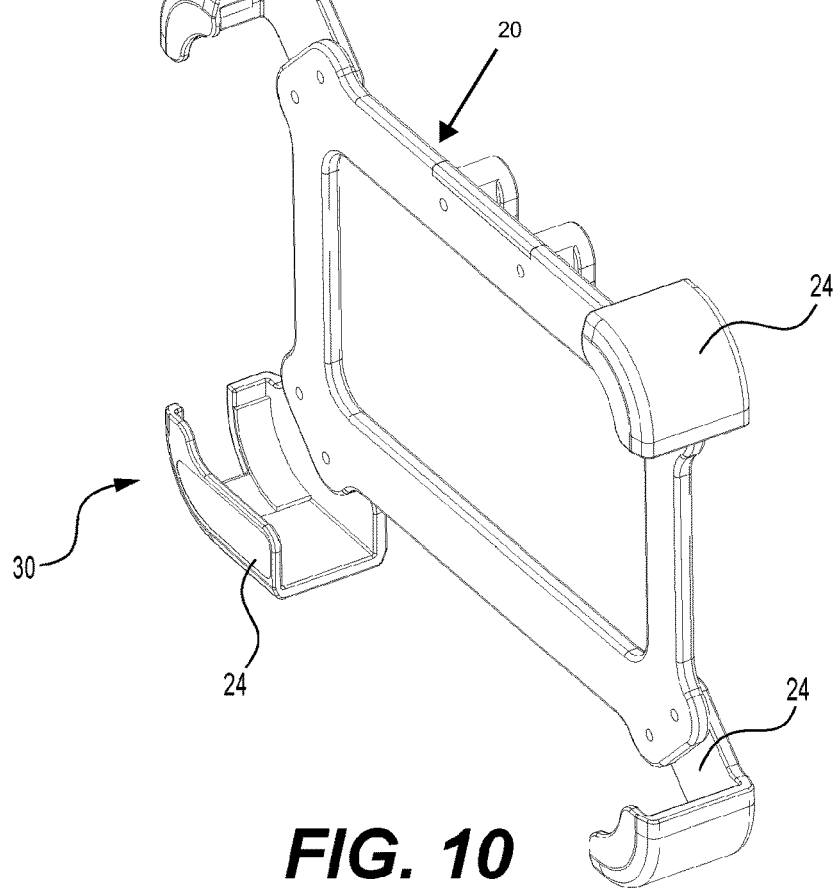
FIG. 10 is a perspective view of a portion of the tablet support unit of FIG. 8, according to certain embodiments of the present disclosure.
Figure 11:
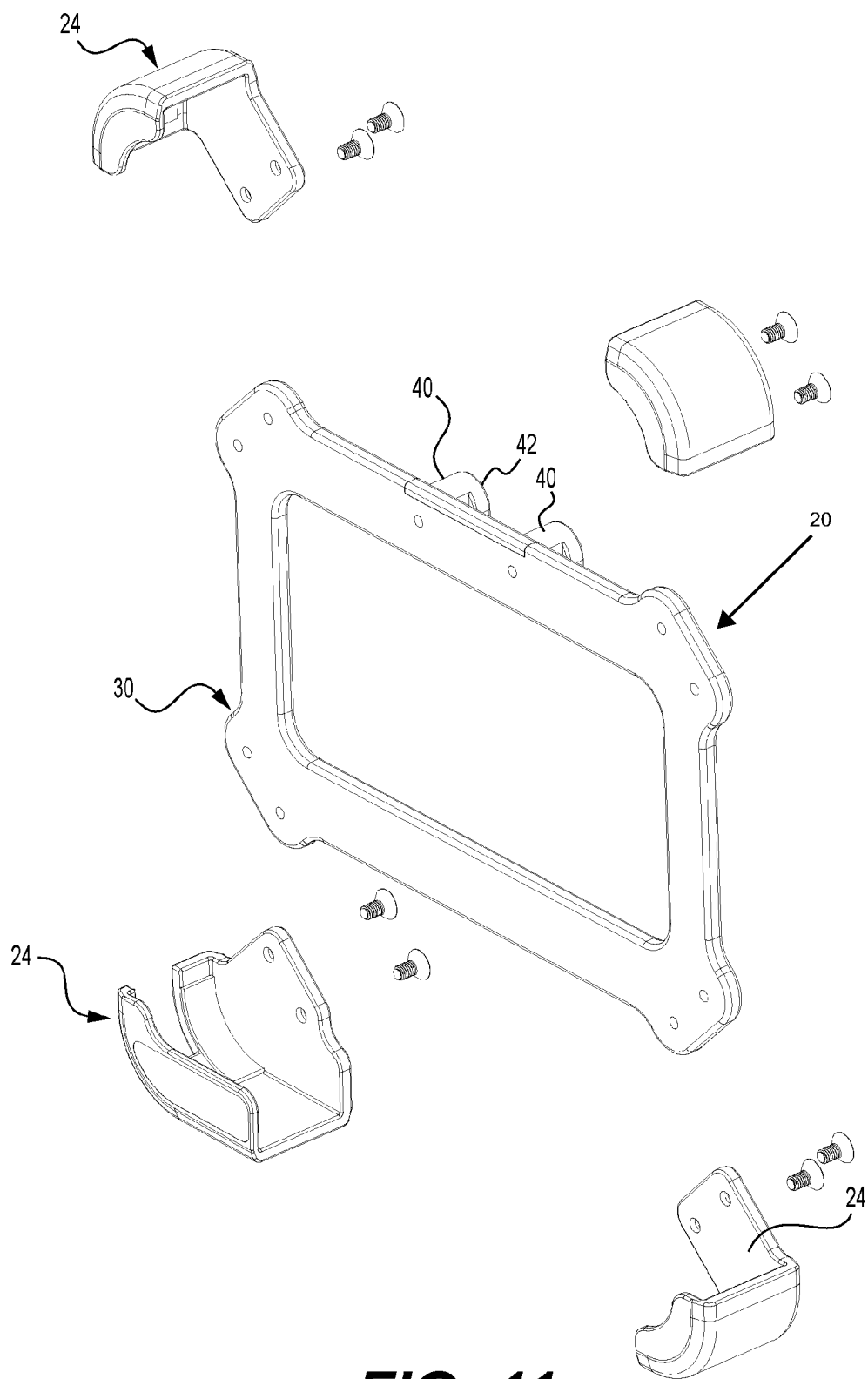
FIG. 11 is an exploded view of the tablet support unit of FIG. 8, according to certain embodiments of the present technology.
Figure 21:
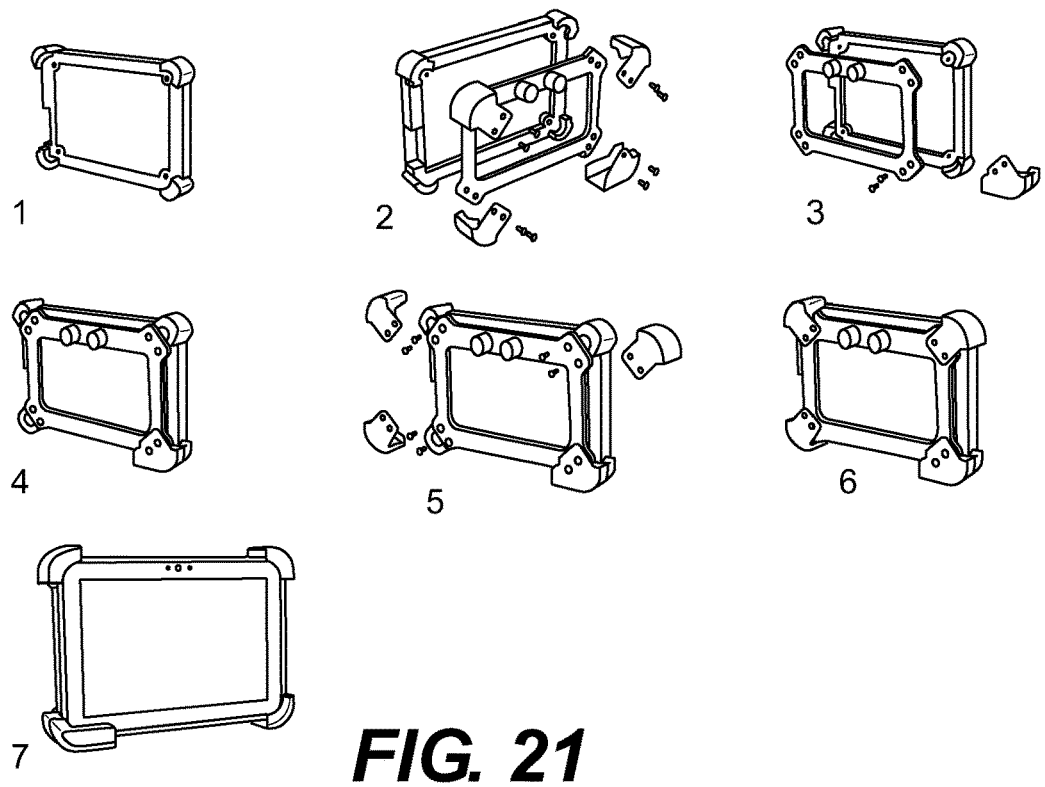
FIG. 21 is a schematic illustrating an assembly of the tablet support unit of FIG. 8, according to certain embodiments of the present technology.

In certain embodiments, the tablet body support portion 20 comprises a back plate 28 and a back frame 30 which can be assembled together with the tablet corner support portions 24 and the tablet 12. The back plate 28 has a planar front face 34 which is sized and shaped to support the tablet 12. In other embodiments (not shown), the front face 34 has a recess formed by a perimeter rim which is sized and shaped to receive the tablet 12. The back frame 30 is sized and shaped to be connected to a back face 36 of the back plate 28. As best seen in FIG. 21, the back frame 30 comprises four support elements 38 which are sized and shaped to extend around, or proximate to, a perimeter of the tablet body support portion 20. Two pins 40 are provided extending from one of the support elements 38. In other embodiments, the number of pins 40 may differ, and the back frame 30 may comprise less than two pins 40 or more than two pins 40. The pins 40 may be provided on a same support element 38 or on different support elements 38. As best seen in FIG. 9, each pin 40 has a free end 42 which is flanged. The pins 40 function as one part of interengageable portions between the adaptor unit 18 and the tablet support unit 16 to connect them together.

The tablet corner support portions 24 are configured to retain the tablet 12 on the tablet body support portion 20. At a first end, each tablet corner support portion 24 is configured to be attached to a corner of the back frame 30 by any means, such as screws, clips, or magnets. The tablet corner support portion 24 has a depth which is sufficient to extend forwardly towards and beyond the tablet body support portion 20 and the tablet 12, once assembled. A second end of the tablet corner support portion 24 can be considered to be a free end 44 once the first end is attached to the back frame 30. The free end 44 is flanged and extends inwardly from a corner at a front face of the tablet, when installed, to retain the tablet 12 in position.

The installation of the tablet 12 into the tablet support unit 16 is illustrated in FIG. 21. As can be seen, the back plate 28 is placed on the tablet 12, the back frame 30 is placed on the back plate 28, the tablet cornet support portions are attached at the first end to a respective corner of the back frame such the free end 44 of the tablet corner support portions extend over the front face of the tablet 12 to retain it on the tablet support unit 16.

In certain other embodiments, instead of the tablet corner support portions 24 being configured to clasp the back plate 28, back frame 30 and tablet 12 at a corner thereof, they may be configured to clasp along any other portion of an edge. The tablet corner support portions 24 and the back frame 30 may be a single piece.

Figure 12:
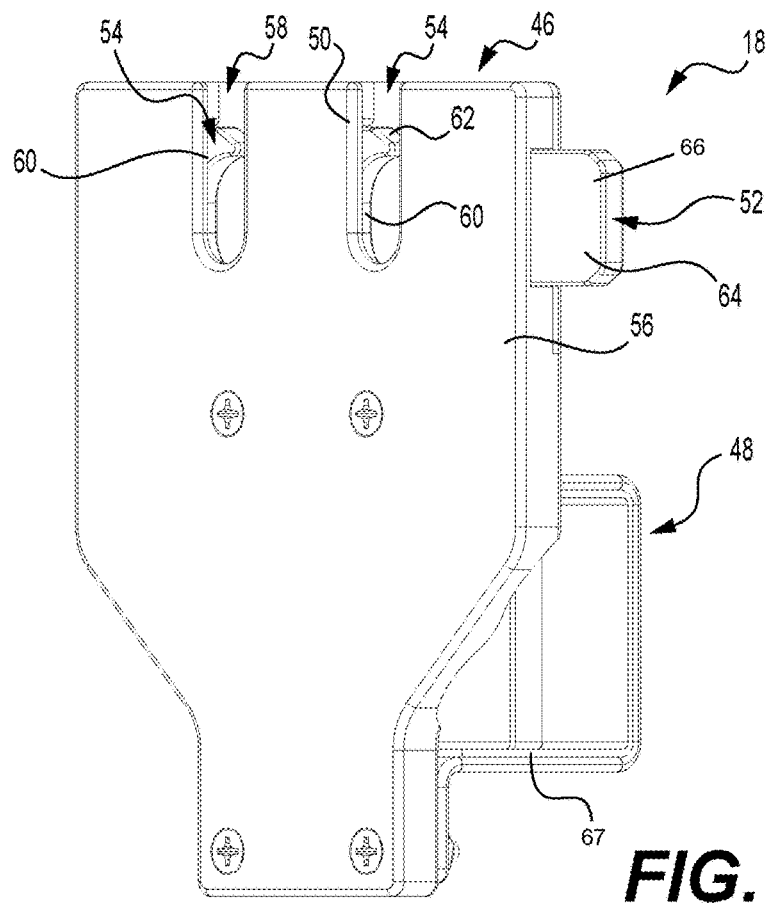
FIG. 12 is a perspective view from a front side of an adaptor unit of the system of FIG. 1 and/or FIG. 4, according to certain embodiments of the present technology.
Figure 13:
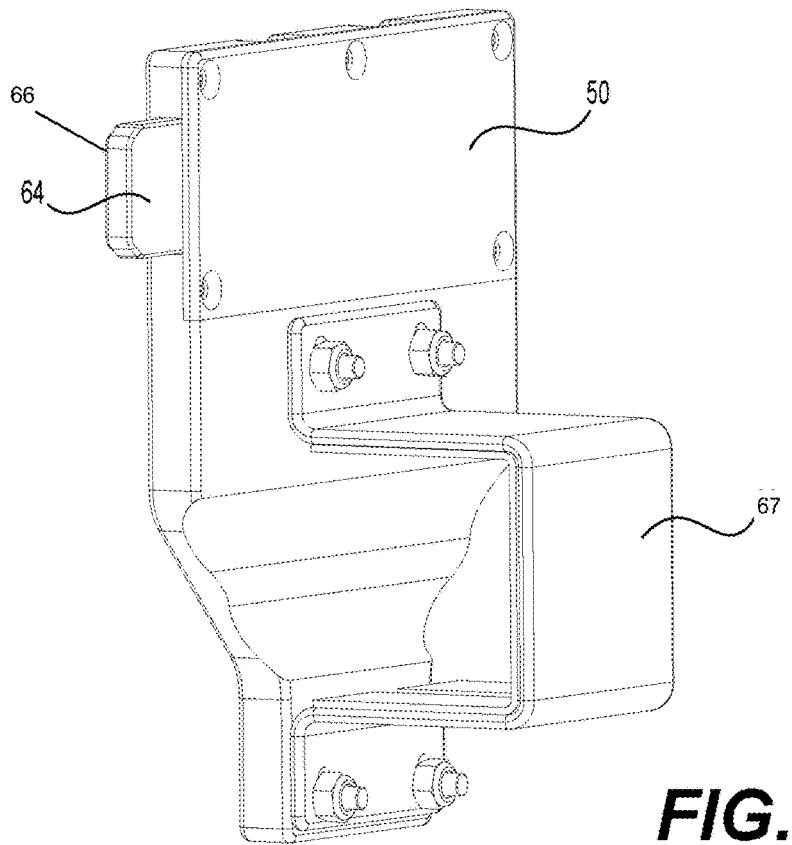
FIG. 13 is a perspective view from a back side of an adaptor unit of the system of FIG. 1 and/or FIG. 4, according to certain embodiments of the present technology.
Figure 14:
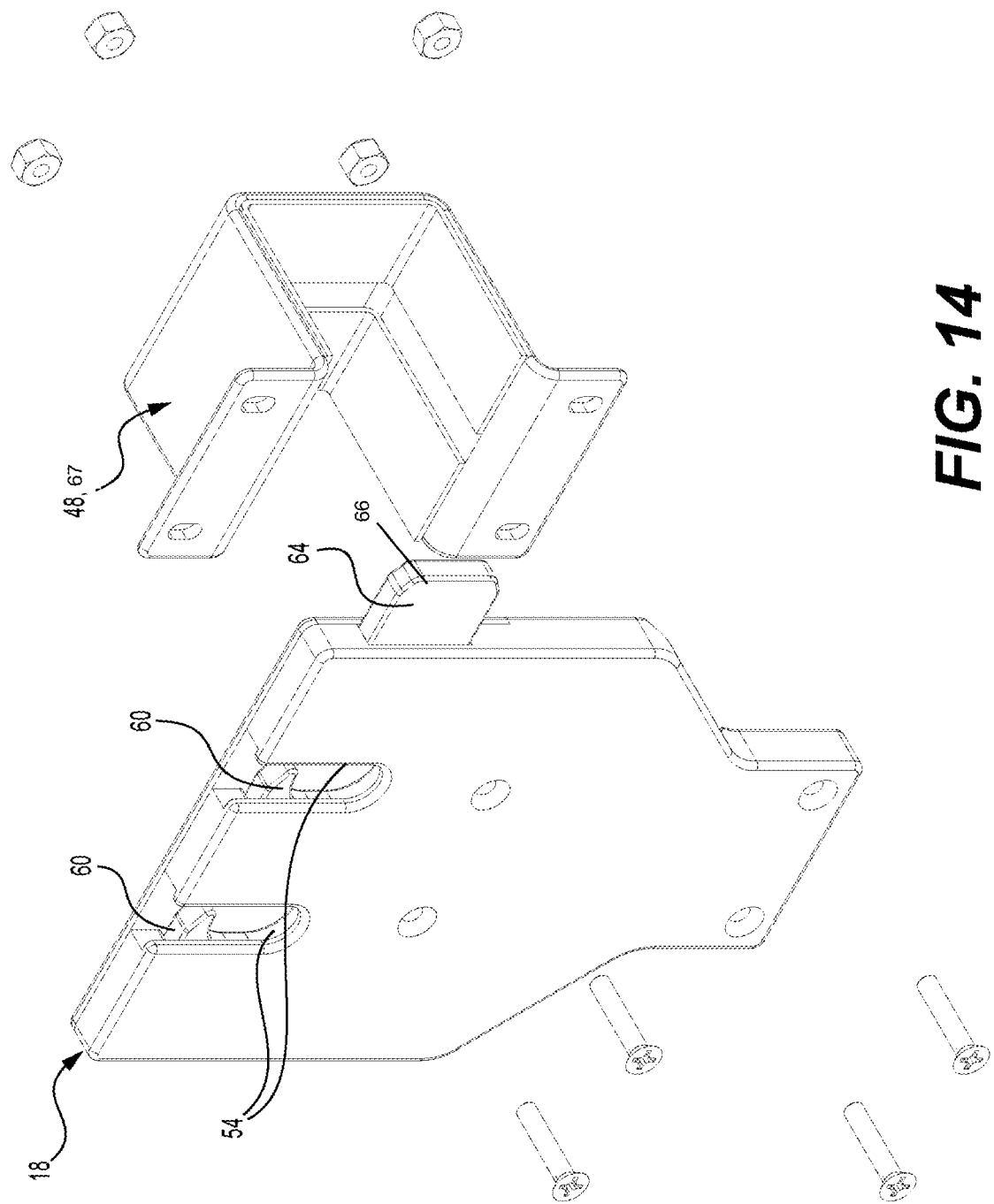
FIG. 14 is an exploded view of the adaptor unit of FIG. 12, according to certain embodiments of the present technology.
Figure 15:
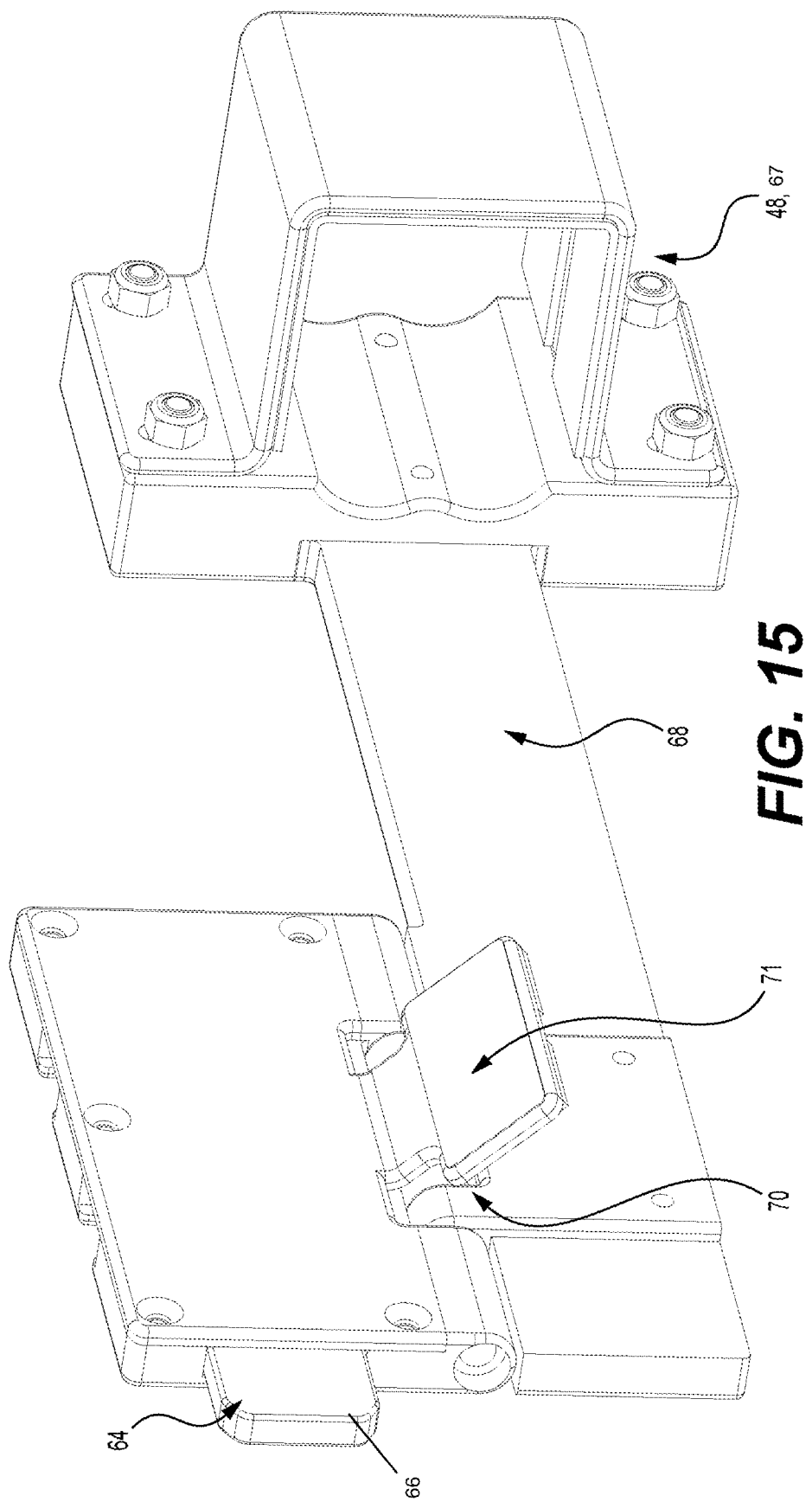
FIG. 15 is a perspective view from a back side of another embodiment of the adaptor unit of FIG. 12, according to certain embodiments of the present technology.
Figure 16:
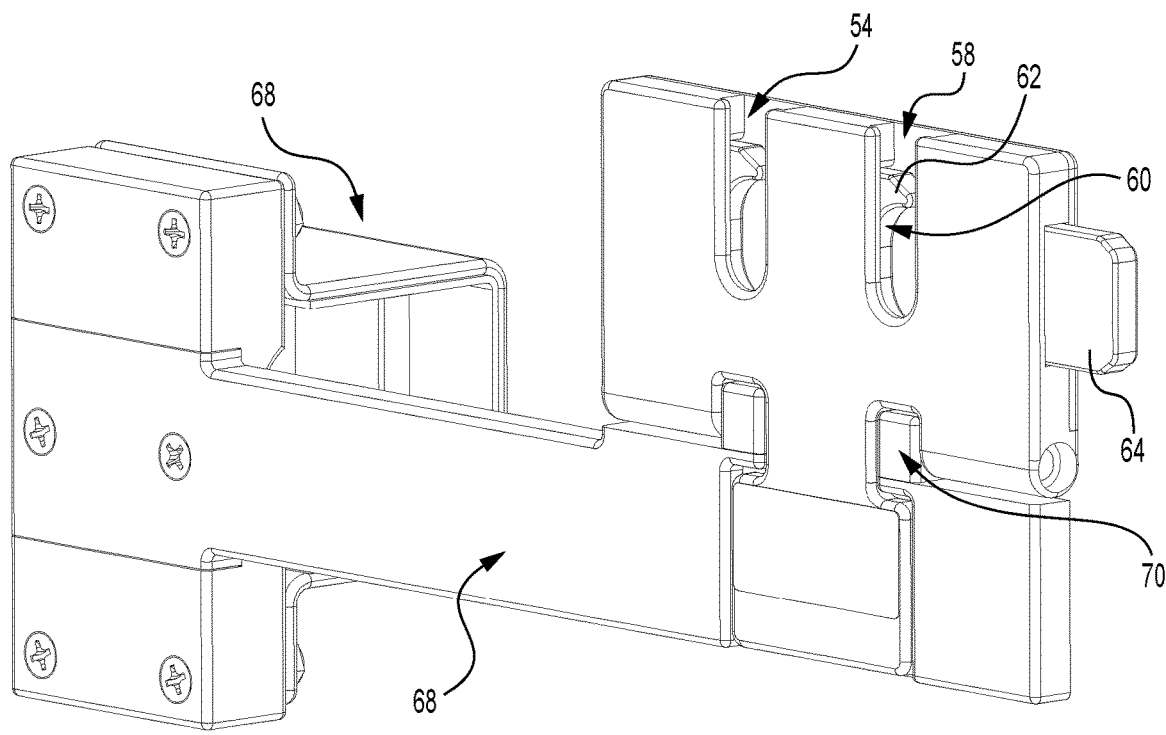
FIG. 16 is a perspective view from a front side of the adaptor unit of FIG. 15, according to certain embodiments of the present technology.
Figure 17:
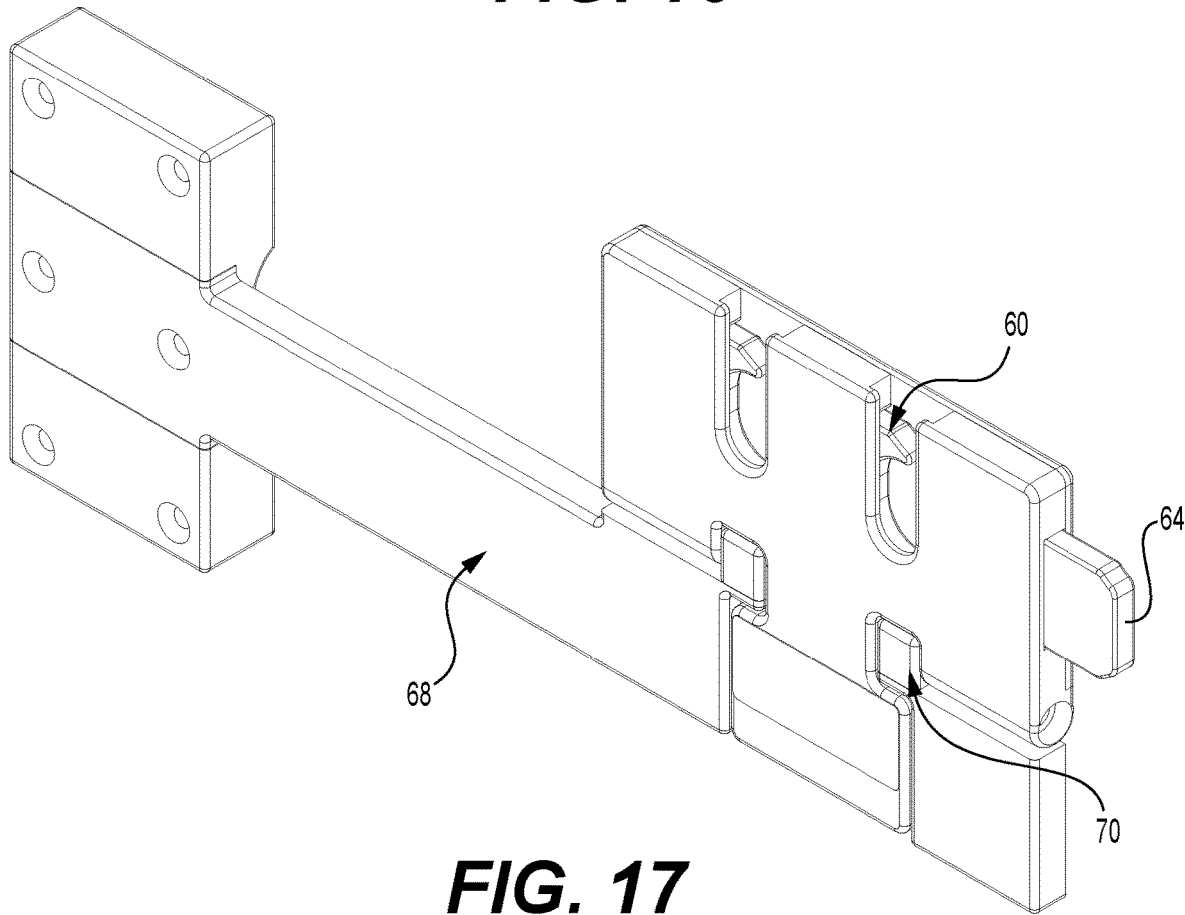
FIG. 17 is a perspective view from a front side of the adaptor unit of FIG. 15, according to certain embodiments of the present technology.
Figure 18:
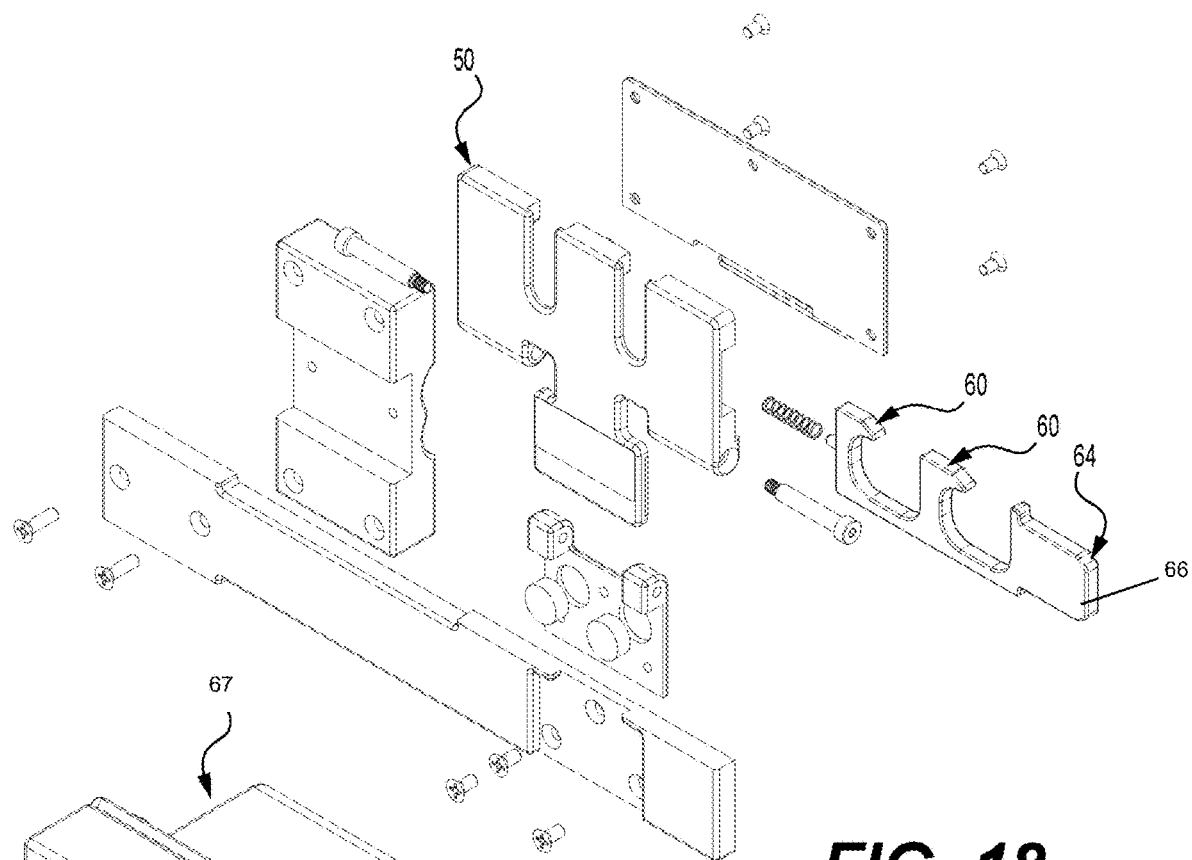
FIG. 18 is an exploded view of the adaptor unit of FIG. 15, according to certain embodiments of the present technology.
Figure 19:
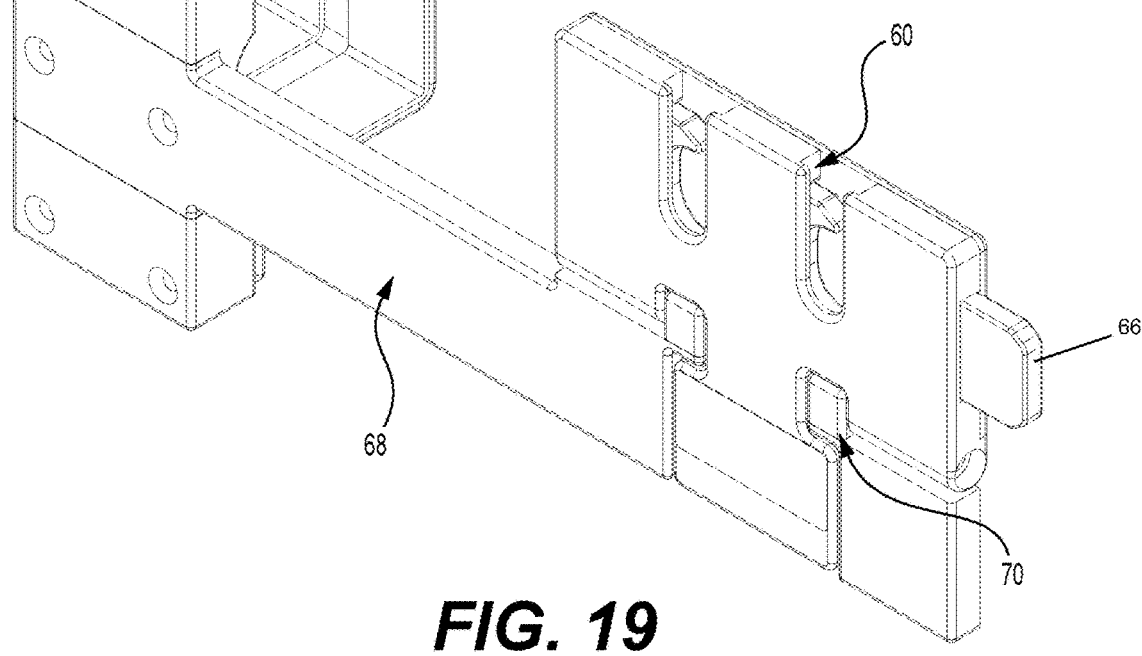
FIG. 19 is a perspective view from a front side of the adaptor unit of FIG. 15, according to certain embodiments of the present technology.
Figure 20:
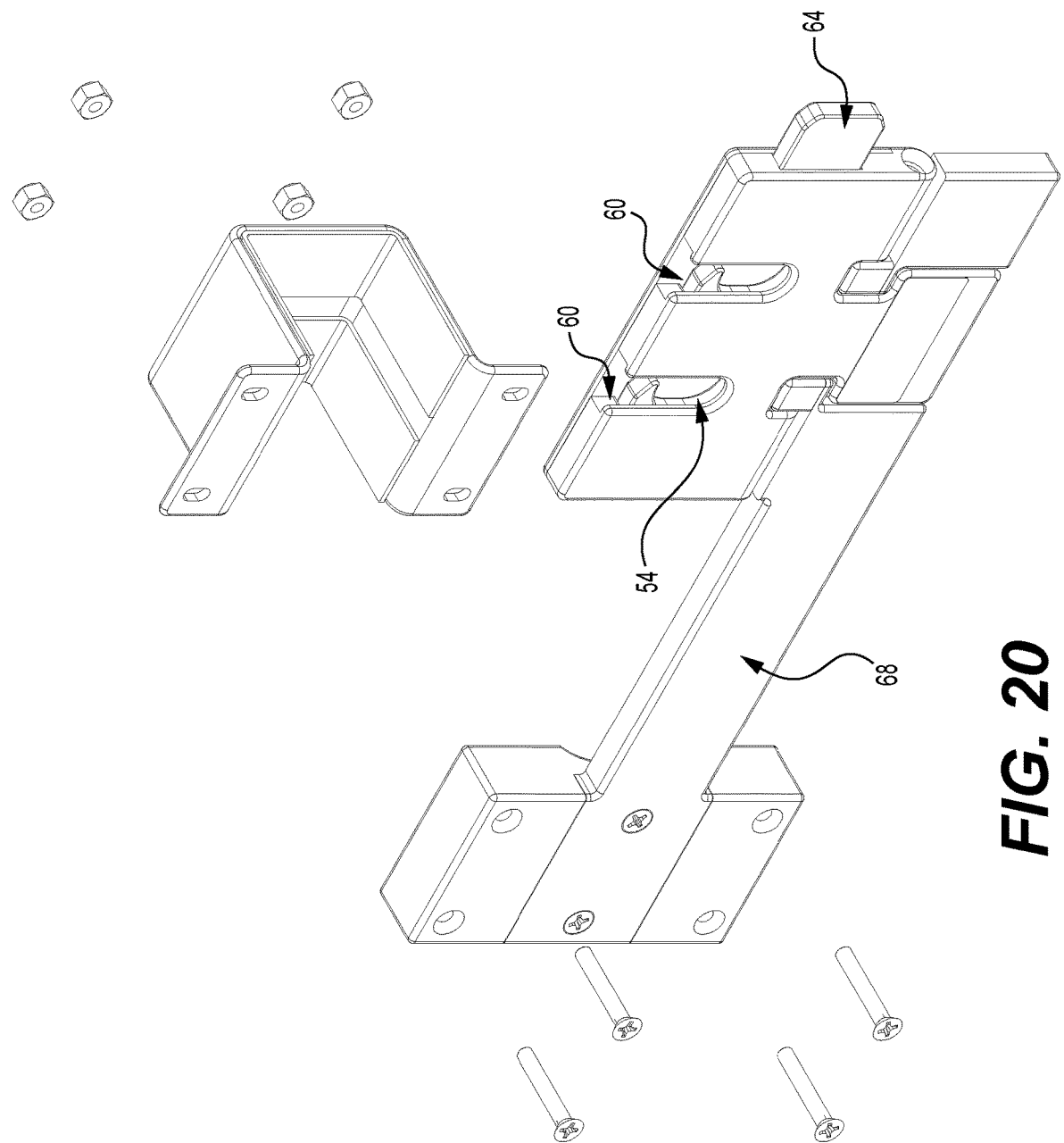
FIG. 20 is a partially exploded view of the adaptor unit of FIG. 15, according to certain embodiments of the present technology.

Referring now to FIGS. 12-14 illustrating the adaptor unit 18. The adaptor unit 18 comprises (1) an adaptor tablet support portion 46 arranged to attach the tablet support unit 16, including the tablet 12, thereto, and (2) an adaptor support surface portion 48 configured to attach the adaptor unit 18 to the support surface 14. The adaptor unit 18 is arranged to releasably attach the tablet support unit by means of attachment and release mechanisms. The attachment and release mechanisms operate on a basis of overcoming a resilient force to snap into position, and to release from each other.

In this respect, the adaptor unit 18 further comprises a tablet support attachment mechanism 50 (also referred to as equipment support attachment mechanism) configured to attach the tablet support unit 16 to the adaptor unit 18, and a release mechanism 52 for releasing the attachment of the tablet support unit 16 to the adaptor unit 18.

In certain embodiments, the tablet support attachment mechanism 50 comprises two slots 54 in a body 56 of the adaptor unit 18, each slot 54 being sized and shaped to receive the flanged free end 42 of the pin 40 through an open end 58 of the slot 54. Also provided is a retaining member 60 in the body 50 of the adaptor unit 18 and which can at least partially extend into the slot 54. The retaining member 60 is arranged to move between a first position in which it at least partially extends into the slot 54 to block the open end 58 of the slot 54 to retain the pin 40 in the slot 54, and a second position in which it is at least partially retracted into the body 50 of the adaptor unit 18 to unblock the open end 58 of the slot 54. The retaining member 60 is resiliently biased to the first position by means of a resilient member such as one or more springs. Pushing each pin 40 into the slot against the retaining member 60 causes the spring to compress and the retaining member to retract at least partially into the body 50 of the adaptor unit 18 (second position). The pin 40 can then be pushed all the way into the slot 54. Once the pin 40 is past the retaining member 60 in the slot (i.e. the force on the retaining member 60 is removed), the retaining member 60 it will move back to the first position.

The adaptor unit 18 is configured such that the slots extend substantially vertically when the adaptor unit 18 is installed on the stretcher 15.

The retaining member 60 has a free end 62 which is arranged to extend into the slot 54 in the first position, and be retracted into the body 50 in the second position. The retaining member 60 is configured such that applying a force against the free end 62 causes the retaining member to actuate from the first position to the second position. In certain embodiments, the free end 62 of the retaining member 60 is arcuate. In certain embodiments, the free end 62 is hook shaped.

An actuator 64 is provided for moving the retaining member 60 from the first position to the second position to release the retention of the pin 40 in the slot 54. A pressure input is required from an operator of the system to actuate the actuator 64. The actuator 64 comprises a tongue 66 extending from the body 50 of the adaptor unit 18 and attached to the retaining member 60. In the illustrated embodiments, the actuator 64 and the retaining member 60 are a single piece. The tongue 66 extends from a side of the adaptor unit 18. A direction of movement of the tongue 66 is orthogonal to an orientation of the slots 54.

In certain embodiments, instead of the slots 54 being provided in the adaptor unit 16 and the pins 40 in the tablet support unit 16, the slots 54 may be provided in the tablet support unit 16 and the pins 40 provided in the adaptor unit 16. Instead of slots 54 and pins 40 which engage, there may be provided any other type of interengageable elements. In fact, the tablet support attachment mechanism can be said to comprise interengageable portions of the tablet support unit and the adaptor unit.

The tablet support attachment mechanism 50 comprises a bracket 67, which is attachable to the body 50 of the adaptor unit 18 by screws, pins or the like. The bracket 67 is sized and shaped to receive the rail 13 of the stretcher 15. When assembled, the rail 13 extends substantially horizontally, and the slots 54 extend substantially vertically.

The extended version of the adaptor unit 18 in FIGS. 15-20 differs from that of the adaptor unit in FIGS. 12-14, in that the bracket 67 is not attached directly to the adaptor unit 18, but to an extender portion 68, which extends transversely from the adaptor unit 18. In use, the extender portion 68 spaces the bracket 67 horizontally from the adaptor unit 18. The extender portion 68 can be considered as an arm for positioning the tablet 12 further away from the stretcher.

A further difference is that the adaptor unit, and hence the tablet 12 once assembled, can be pivoted with respect to the extender portion 68. In this respect, the adaptor unit 18 is connected to the extender portion 68 by a pivot 70. Therefore, the tablet 12 can be positioned at different angles with respect to the rail 13, once assembled. This can permit the use of the tablet at different angles. In certain embodiments, the angles are 0 degrees and 45 degrees. In other embodiments, the angles are one or more of 5 degrees, 10 degrees, 15 degrees, 20 degrees, 25 degrees, 30 degrees, 35 degrees, 40 degrees, 50 degrees, 55 degrees, 60 degrees, 65 degrees, 70 degrees, 75 degrees, 80 degrees, 85 degrees, or 90 degrees. In certain embodiments, magnets 71 may be provided to ensure a securing of the tablet 12 at the required inclination.

A first end of the extender portion 68 is connectable to the adaptor unit 18, and a second end of the extender portion 68 is connectable to the support surface 14. A distance between the first end and the second end determines a distance of the tablet 12 from the stretcher 15. In certain embodiments, the extender portion 68 is a single piece, and can be provided with different lengths depending on a desired separation of the tablet 12 from the stretcher 15. In certain other embodiments, the extender portion 68 may have a length which can be adjusted.

In certain embodiments, the adaptor unit 18 of FIGS. 12-14 is 8.3 inches high, 5.1 inches wide and 15.5 inches long. In certain embodiments, the adaptor unit 18 of FIGS. 15-20 is 8.3 inches high, 4.5 inches wide and 12.3 inches long.

Figure 22:
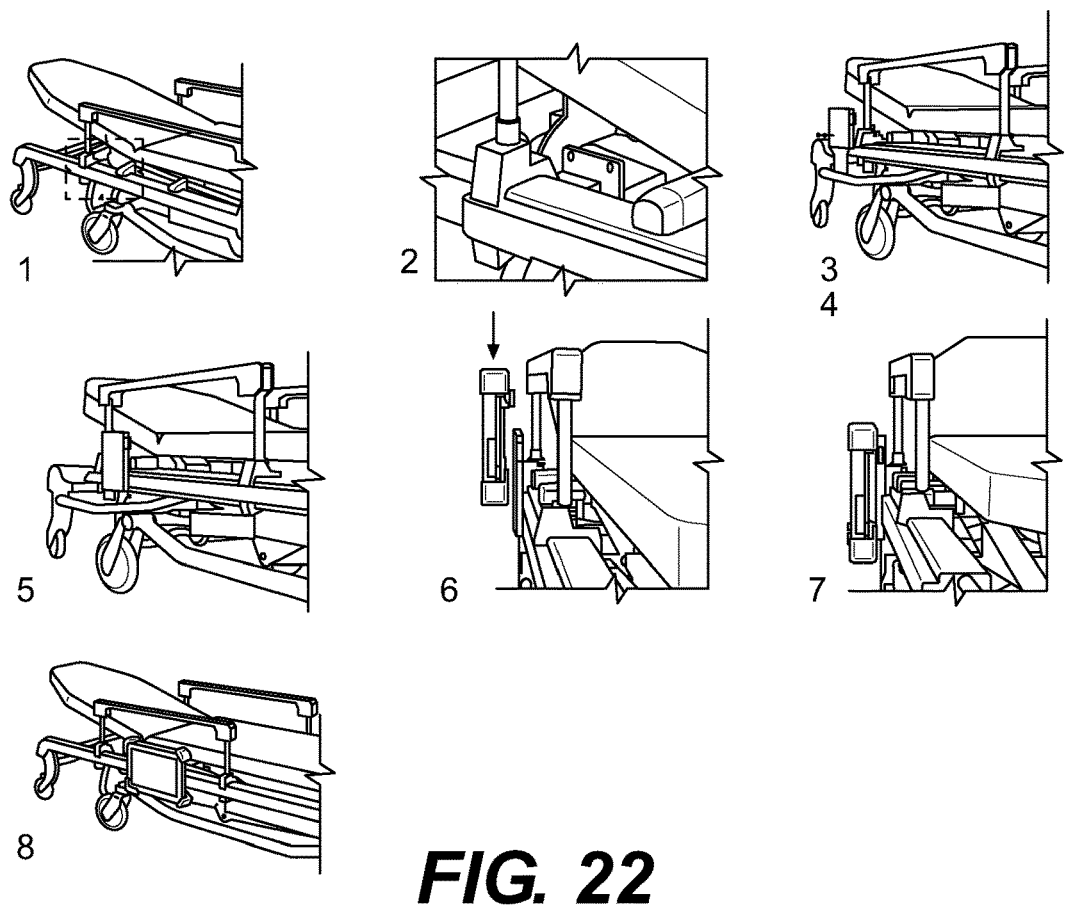
FIG. 22 is a schematic illustrating an assembly of the system of FIG. 1, according to certain embodiments of the present technology.
Figure 23:
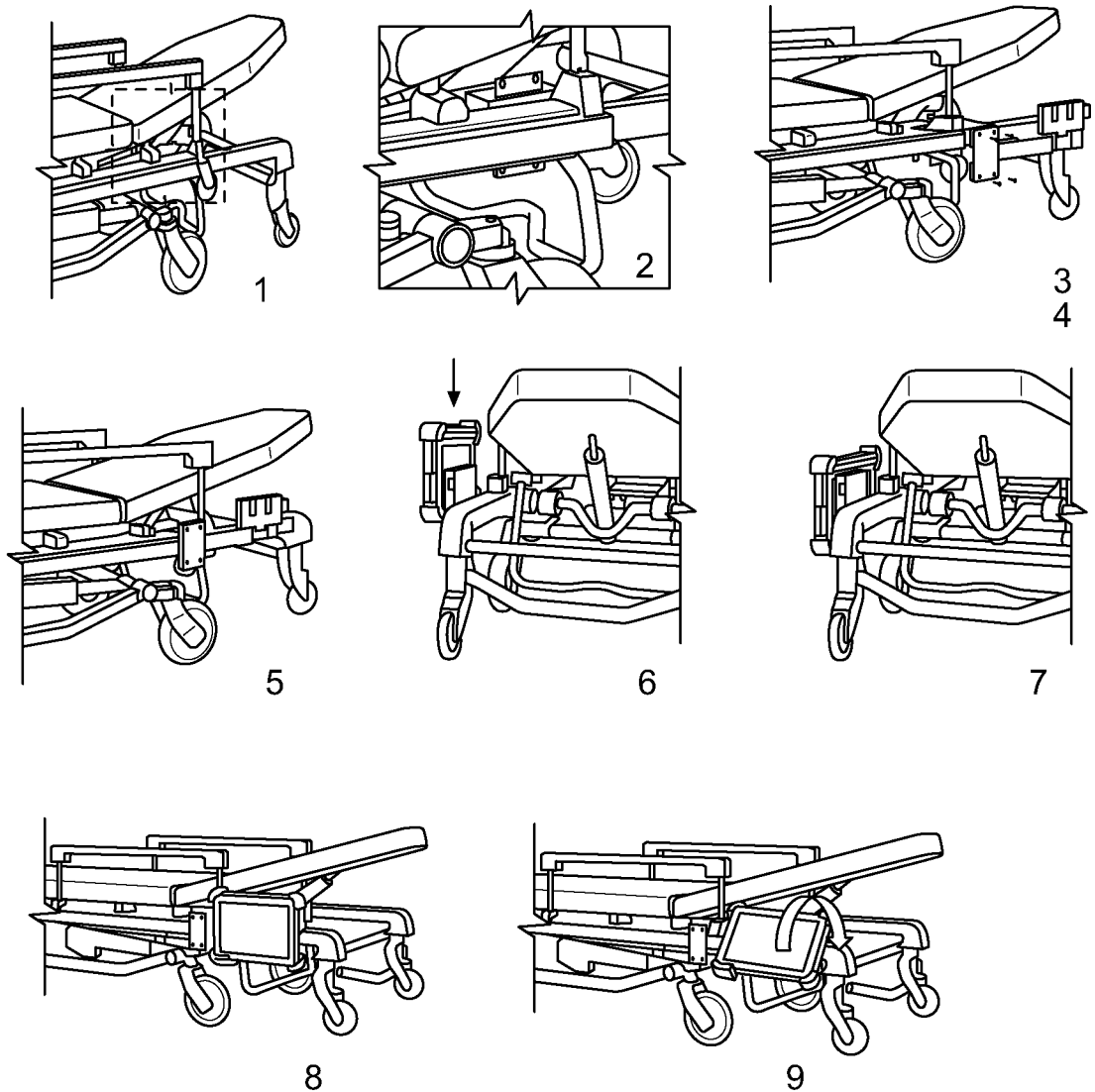
FIG. 23 is a schematic illustrating an assembly of the system of FIG. 4, according to certain embodiments of the present technology.

The manner of attaching the adaptor unit 18 to the support surface 14 is illustrated in FIGS. 22 and 23. Firstly, the adaptor unit 18 is attached to the rail 13 of the stretcher 15 by the bracket 66. Then the tablet support unit 16 can be attached to the adaptor unit by clicking the pins 40 into the slots 54.

As the tablet 12, or other equipment, can be attached to the support surface 14 without screws, an integrity of the tablet 12 or other equipment is maintained. Installation and removal of the tablet from the stretcher is quick and can be performed single handedly.

In certain embodiments, the adaptor unit 18 and/or the tablet support unit 16 can be made from materials which can be readily cleaned and/or sterilized. In some embodiments, the adaptor unit 18 and/or the tablet support unit 16 are made from high density aluminium.

In certain embodiments, the system 10, or at least some portions of the system 10 are provided as a kit. For example, in certain embodiments, there is provided a kit comprising one or more of: the tablet support unit 16 comprising one or more of the back plate 28, back frame 30 and the tablet corner support portions 24; and the adaptor unit 18. Optionally, the extender portion 68 may be provided as an optional component in the kit.

The tablet support unit 16 is impact resistant in certain embodiments. The adaptor unit 18 is impact resistant in certain embodiments. In certain embodiments, the locking mechanisms (e.g. the adaptor tablet support portion 46 and the adaptor support surface portion 48) are impact resistant. In certain embodiments, the release mechanism 52 is impact resistant.

Advantageously, the tablet 12 or other equipment can be mounted to a left side or a right side of the stretcher 14 or other support surface. The system 10 can provide a clear view of the tablet 12 or other equipment to the patient or a care provider.

Advantageously, the system 10 can ensure secure placement of the tablet 12 or other equipment during transportation of the support surface. This increases patient and care giver safety and reduces a risk of damage to the tablet 12 or other equipment.

Certain embodiments of coupling devices and systems which could be used with the present system 10, are described in U.S. 62/915,806 filed Oct. 16, 2019, U.S. 62/909,408, filed Oct. 2, 2019, and U.S. 62/983,075 filed Feb. 28, 2020, the contents of which are herein incorporated by reference.

Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented. Examples of changes, substitutions, and alterations are ascertainable by one skilled in the art and could be made without departing from the scope of the information disclosed herein.

It should be expressly understood that various technical effects mentioned throughout the description above need not be enjoyed in each and every embodiment of the present technology. As such, it is anticipated that in some implementations of the present technology, only some of the above-described technical effects may be enjoyed. While in other implementations of the present technology, none of the above enumerated technical effects may be present, while other technical effects not specifically enumerated above may be enjoyed. It should be expressly understood that the above enumerated technical effects are provided for illustration purposes only, to enable those skilled in the art to better appreciate embodiments of the present technology and by no means are provided to limit the scope of the present technology or of the claims appended herein below.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A system for attaching an equipment to a support surface, the system comprising:
   an equipment support unit having:
      an equipment body support portion to support a body of the equipment,
   an adaptor unit for attaching the equipment support unit to the support surface, the adaptor unit comprising:
      an adaptor equipment support portion having:
         an adaptor equipment support attachment mechanism configured to releasably attach the equipment support unit to the adaptor unit, and
         an adaptor support surface portion configured to attach the adaptor unit to the support surface; and
      a release mechanism for releasing the attachment of the equipment body support portion to the adaptor unit; and
   the equipment support unit and the adaptor unit have interengageable portions for releasably attaching the equipment support unit and the adaptor unit.

2. The system of claim 1, wherein the equipment support unit includes at least one equipment corner support portion.

3. The system of claim 2, wherein the equipment body support portion comprises a back plate having a front face for supporting the equipment, and a back frame configured to be attached to a back face of the back plate.

4. The system of claim 3, wherein each equipment corner support portion is arranged to be attached at one end to a corner of the back frame and have a depth to extend beyond the back plate and the equipment, in use, and have a flanged free end extending inwardly on a front face of the equipment to retain the equipment in position.

5. The system of claim 3, wherein the back frame comprises four support elements sized and shaped to extend around a perimeter of the back plate when the back plate and the back frame are assembled.

6. The system of claim 1, wherein the adaptor support surface portion comprises a bracket for attaching to the support surface.

7. The system of claim 6, wherein the support surface is a rail of a stretcher and the bracket is sized and shaped to support the rail on three of four sides.

8. The system of claim 1, the adaptor unit further comprising an extender portion, connectable at one end to the adaptor unit and at the other end to the adaptor support surface portion.

9. The system of claim 8, wherein a body of the adaptor unit is pivotally connected to the extender portion.

10. The system of claim 1, wherein the interengageable portions comprise:
    a pin having a flanged end, and
    a slot having an open end arranged to receive the flanged end of the pin.

11. The system of claim 10, wherein the slot is formed in the body of the adaptor unit and the pin extends from the equipment support unit.

12. The system of claim 11, wherein there are provided two slots and two pins.

13. The system of claim 10, wherein the release mechanism comprises a retaining member arranged to permit engagement of the interengageable portions and to block a separation of the interengageable portions, wherein the retaining member is configured to be actuated to allow the separation of the interengageable portions.

14. The system of claim 13, wherein the retaining member is arranged to move between a first position in which it extends into the slot to block the open end of the slot to retain the pin in the slot, and a second position in which it is retracted into the body of the adaptor unit to unblock the open end of the slot.

15. The system of claim 14, wherein the retaining member is resiliently biased to the first position.

16. The system of claim 14, wherein the retaining member has a first end that extends into the slot when the retaining member is in the first position, and wherein the first end of the retaining member is arcuate.

17. An adaptor unit for releasably attaching a tablet to a support surface, the adaptor unit comprising:
- a tablet attachment mechanism configured to releasably attach the tablet to the adaptor unit;
- a support surface attachment mechanism configured to attach the adaptor unit directly to the support surface; and
- a release mechanism for releasing the attachment of the tablet to the adaptor unit;
- interengageable portions between the tablet and the adaptor unit which mechanically engage to connect the tablet to the adaptor unit, and
- the release mechanism comprises an actuator, actuation of which causes release of the interengageable portions.

18. The adaptor unit of claim 17, wherein the interengageable portions comprise a pin having a flanged free end which is receivable in a slot having an open end.

19. The adaptor unit of claim 18, further comprising a retaining member which is arranged to extend into the slot to block the open end of the slot to retain the pin in the slot.

20. A system for attaching an equipment to a support surface, the system comprising:
- an equipment support unit having:
  - an equipment body support portion to support a body of the equipment, the equipment body support portion having at least one pin; and
- an adaptor unit for attaching the equipment support unit to the support surface, the adaptor unit comprising:
  - an adaptor equipment support portion defining at least one slot for receiving the at least one pin to releasably attach the equipment body support portion to the adaptor equipment support portion;
  - an adaptor support surface portion configured to attach the adaptor unit to the support surface; and
  - an adaptor equipment support attachment mechanism and a release mechanism for releasably attaching and releasing the equipment body support portion and the adaptor equipment support portion.

* * * * *